United States Patent [19]

Anderson et al.

[11] Patent Number: 5,023,902
[45] Date of Patent: Jun. 11, 1991

[54] RADIO CHANNEL UNIT MESSAGE AND CONTROL SIGNAL PROCESSING ARCHITECTURE

[75] Inventors: Carl R. Anderson, Summit; Paul R. Comrie, Irvington; Peretz M. Feder, Englewood; George I. Zysman, Mendham, all of N.J.

[73] Assignee: AT&T Bell Laboratories, Muray Hill, N.J.

[21] Appl. No.: 473,011

[22] Filed: Jan. 31, 1990

[51] Int. Cl.$^5$ ............................................ H04M 11/00
[52] U.S. Cl. .......................................... 379/59; 455/90
[58] Field of Search .................................... 379/58-60, 379/63; 455/90

[56] References Cited

U.S. PATENT DOCUMENTS 4,486,624 12/1984 Puhl et al. ............................. 379/60
4,694,484 9/1987 Atkinson et al. ...................... 379/59
4,932,049 6/1990 Lee ......................................... 379/59

OTHER PUBLICATIONS

"Communications and Control Architecture", by L. A. Baxter et al., AT&T Technical Journal, vol. 64, No. 1, Jan. 1985, pp. 153-173.

Primary Examiner—Jin F. Ng
Assistant Examiner—Dwayne D. Bost
Attorney, Agent, or Firm—A. G. Steinmetz

[57] ABSTRACT

A new architecture for a cellular radio telephone system groups all of the critical cellular functions within a single circuit package in order to provide enhanced versatility to accommodate changes in requirements, including processing means and channel changes in the cellular system by changing or replacing just the particular module itself.

7 Claims, 5 Drawing Sheets

RADIO CHANNEL UNIT MESSAGE AND CONTROL SIGNAL PROCESSING ARCHITECTURE

FIELD OF THE INVENTION

This invention relates to the processing of speech and control signals in a cellular mobile telephone land cell site and in particular to an architecture arrangement in modularizing various signal processing functions to facilitate modifications to the system.

BACKGROUND OF THE INVENTION

Connecting a telephone line to a cellular unit requires connecting a central office switch of the public switched telephone network (PSTN) to a mobile telephone switching office (MTSO) which in turn is connected to radio equipment, via message signal and control signal processing and switching equipment. This arrangement with its varied circuitry and systems has typically been positioned and packaged rather diversely. Changes to the system have required significant modifications to the wiring and replacement of many individual component packages.

Cellular radio telephone systems operating specifications, related to system aspects including message and data signal processing, are governed by regulatory agencies whose mandated standards are constantly changing. Any change in these standards, such as a change in protocol requirements, almost automatically means a significant change in the switching and processing circuitry used in the cellular telephone system. Modifying the present equipment to meet the new standards can mean extensive changes to many individual component units and system packages.

SUMMARY OF THE INVENTION

A new architecture is disclosed in which the grouping of certain critical cellular functions are all grouped within a single module in order to provide built in versatility to accommodate changes in requirements, including processing means protocols and channel changes in the cellular system by changing or replacing just the particular module itself.

In an illustrative cellular system, embodying the principles of the invention, components and circuit packages related to a cellular channel specific technology are all embodied within a single specific plug in module. Processing of speech and control signals supplied on a common bus from the MTSO is performed within the confines of a single processing module within the radio channel frame. The module is designed to use a common bus for speech signals (from the PSTN) and control signals (from both the MTSO and cell site control). Speech and control signals are applied to the module from the MTSO on a common bus and control signals are provided by the cell site controller. These signals are connected to a subsequent radio transceiver which convert it to a radio signal. Incoming radio signals are processed into the speech and control for application to the MTSO.

DETAILED DESCRIPTION

Figure 1:
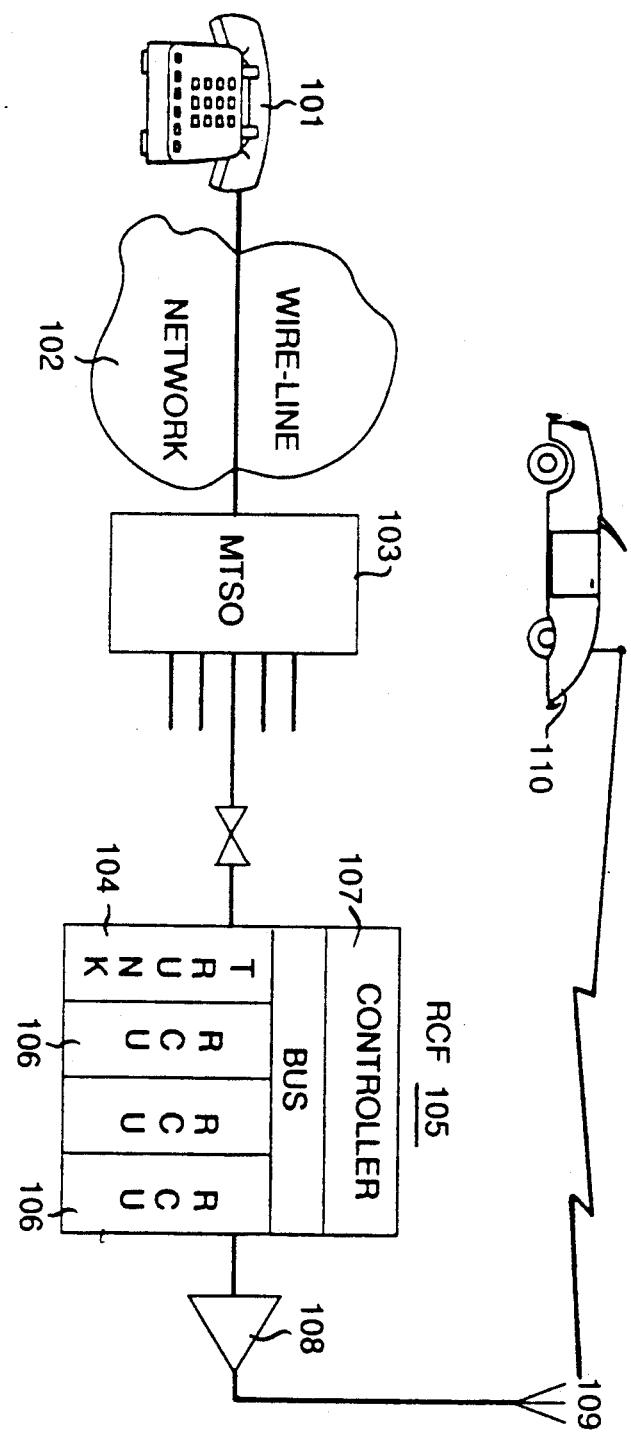
FIG. 1 is a block schematic of a cellular mobile radio telephone system.

A cellular mobile telephone system is shown in FIG. 1. A subscriber's telephone equipment, shown schematically as a handset 101, is shown connected through a wire-line switched telephone network (PSTN) 102 to a mobile telephone switching office (MTSO) 103 of the cellular provider. The MTSO has a plurality of switch selected outputs, at least one of which is connected to a trunk 104 of the radio channel frame (RCF) 105. The trunk 104 is connected to the various channel units (RCU) 106 included in the RCF 105. A stored program controller 107 is included in the RCF 105 to provide control functions to the individual RCUs 106. The individual RCUs 106 are all coupled through a linear amplifier 108 to an antenna 109 which radiates speech and data to mobile telephone stations 110.

Figure 2:
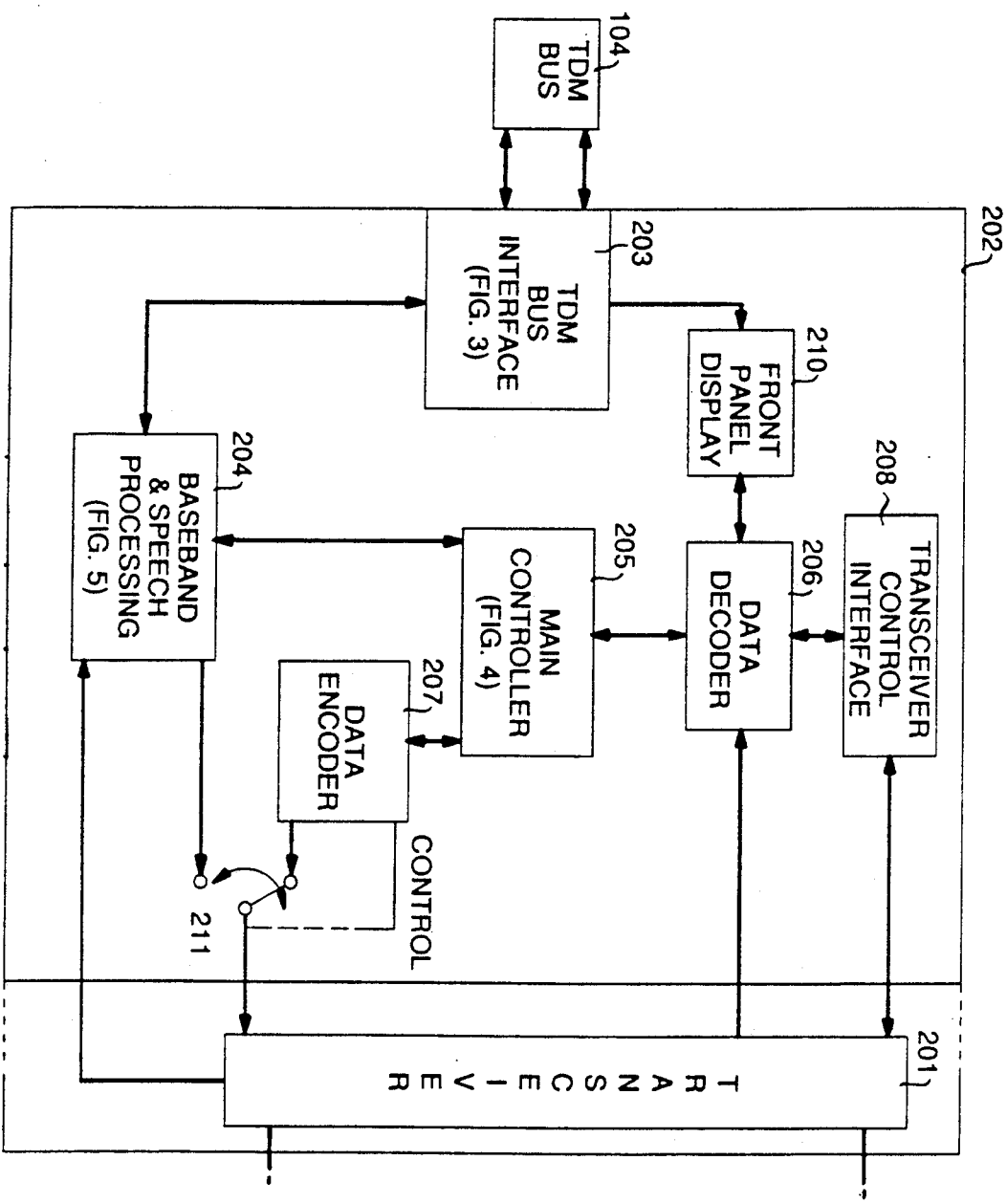
FIG. 2 is a block schematic of a radio channel unit signal processing, communication and control module.
Figure 6:
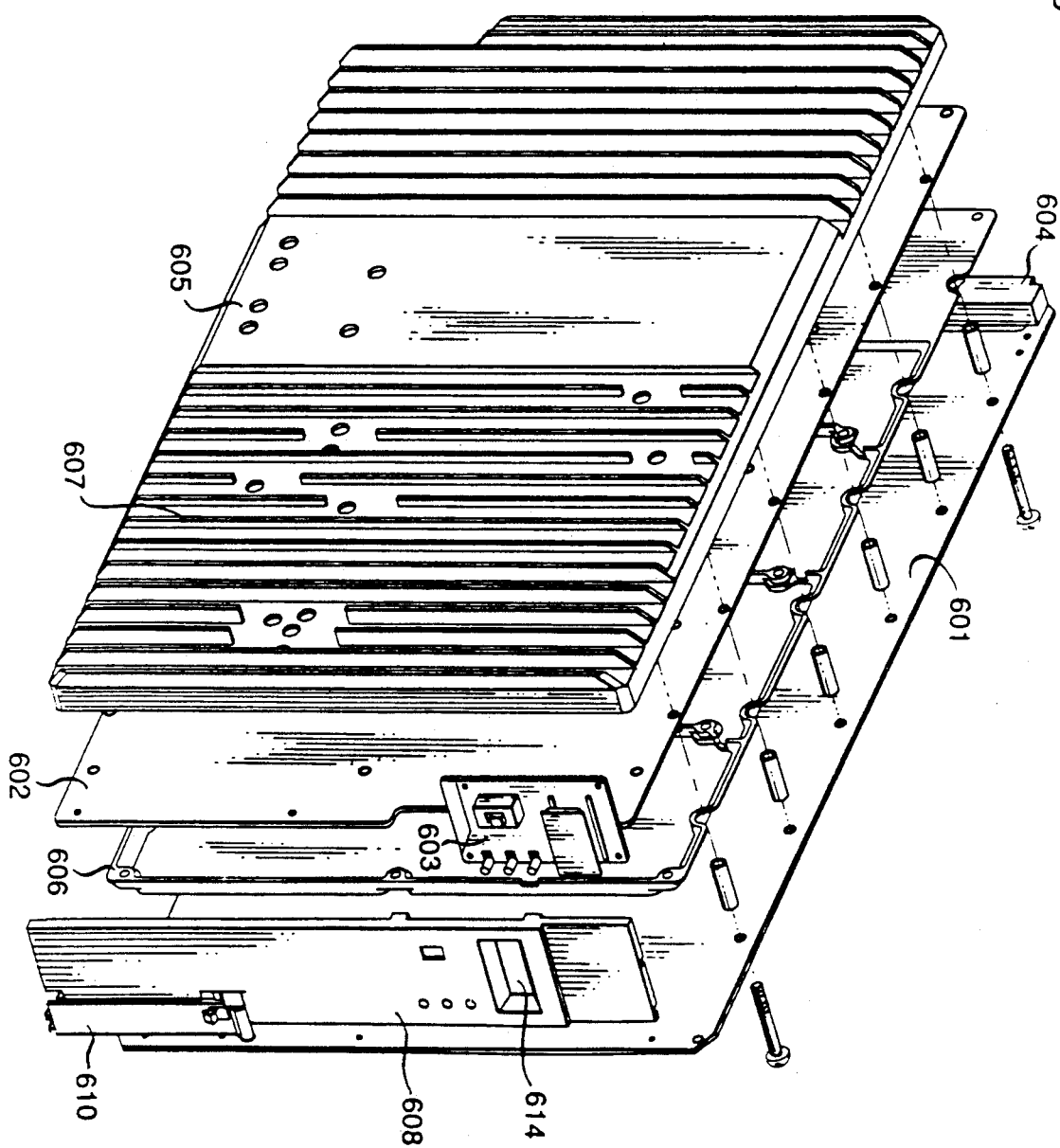
FIG. 6 is a view of a package arrangement of the module embodying the principles of the invention.

The RCU 106 includes a radio transceiver unit and a signal processing, control and communication module (SPM). The raido transceiver and the SPM are normally physically coupled together in a single package as shown in FIG. 2. The radio transceiver 201 is shielded and both electrically and mechanically attached, as shown in FIG. 6, to the printed circuit board of the SPM 202, which has the signal processing and control circuitry mounted thereon. Printed circuit board of the SPM 202 has a pluralilty of specification controlling components including a bus interface 203, a baseband and speech processing circuit 204, a stored program controller 205, a data decoder 206, a data encoder 207, and an interface control circuit 208 to electrically connect these circuits to the radio transceiver 201. A panel display 210 is included so that the operative status of or other information related to the circuit board 202 may be displayed.

Bus interface unit 203 is coupled to a time division multiplexed (TDM) bus of a trunk 104 connected to the PSTN. A main controller circuit 205 is connected with the bus interface unit 203 and responds to signals from a communication link controller (CLC) (not shown) associated with the input TDM bus. The circuit board 202 has a unique address determined by its specific location (ie the address the backplane pin connections in RCF). Signals received by the bus interface unit 203 are applied to the baseband and speech processing circuit 204 and the main controller 205. The baseband and speech processing unit 204 is operative to perform speech signal processing, syllabic compression and expansion, pre-emphasis and de-emphasis and supervisory audio tone (SAT) generation and detection. These processes are critically determined by the requirements and specs of the cellular radio telephone system. Processing circuit 204 may be embodied in a digital signal processor and processes the speech signals under the control of the main controller 205.

Digital signals intended for transmission to a mobile unit are applied from the main controller 205 to a data encoder circuit 207 which formats the data and converts the signal to analog format. This analog signal is transmitted via a switch 211, to the transceiver radio unit 201. Interfaces with the transceiver 201 are under the control of the transceiver interface control 208 which is operative to control the on-off status, operating frequency and power level of the transceiver radio unit 201.

Signals received by the transceiver 201 from mobile units 110 are received and applied to the data decoder circuit 206 under control of the transceiver interface control 208. Decoder 206 converts the received analog signal to a digital format. The digital signals are decoded, formatted and applied to the controller 205. Other signals are processed as appropriate and the information is applied to the controler 205.

Speech signals are applied, to the baseband and speech processing circuit 204, which in turn de-emphasizes syllabic expands and detects the SAT signal. The baseband and speech processing circuit applies these signals to the bus interface 203 for application to the TDM bus 104 and the PSTN.

Figure 3:
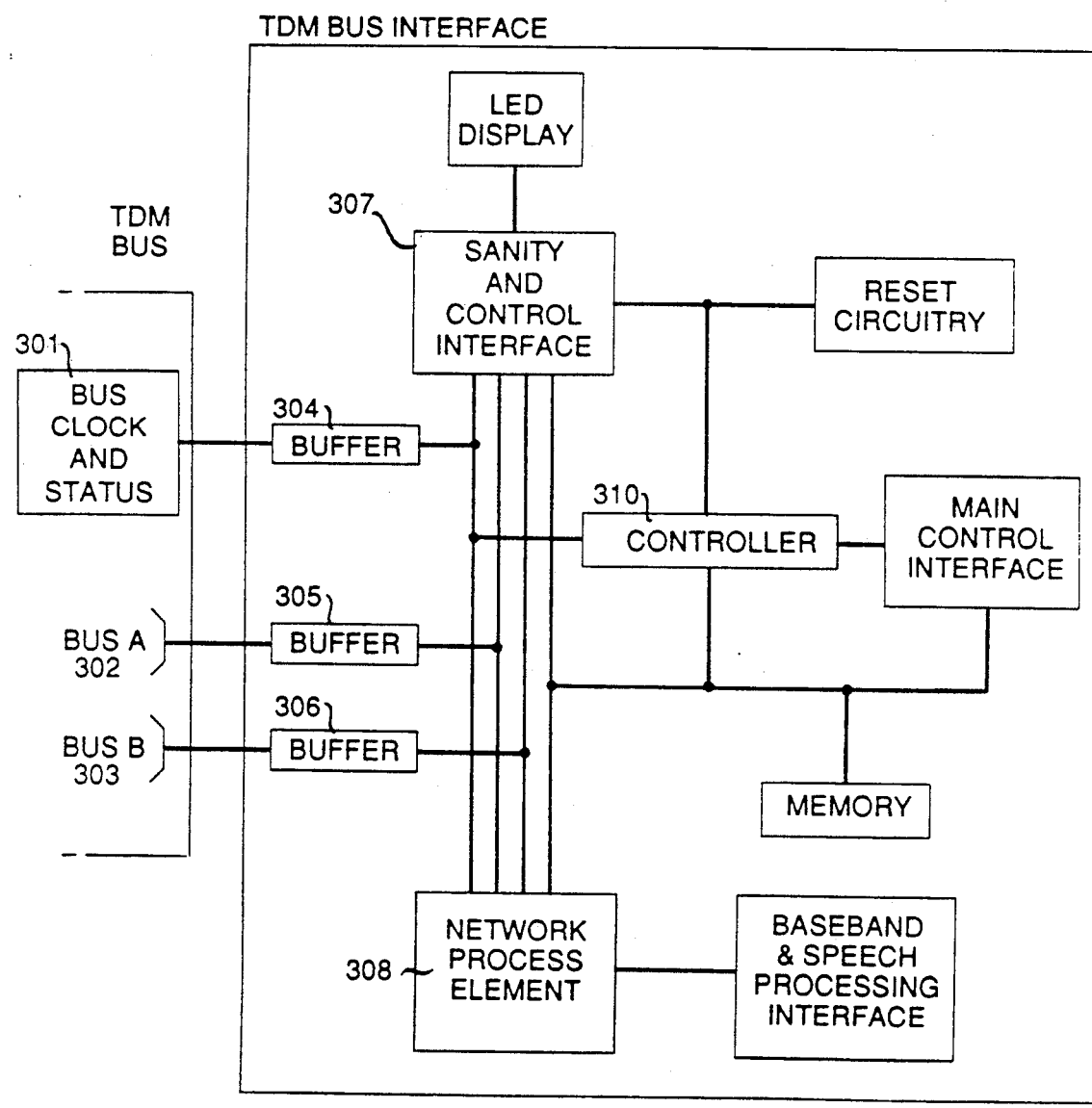
FIG. 3 is a block schematic of a TDM Bus interface included in the module of FIG. 2.

The bus interface unit is shown in schematic block form in FIG. 3. and shows the TDM bus output of the MTSO as including a bus block and status control 301 and bus transmission lines 302 and 303. These are all connected through the backplane to the buffer units 304, 305 and 306 of the SPM. Each of the busses 302 and 303 includes a specified number of time slots divided between control functions and the transmission of user information. Only one of the busses at a time is used to carry control information. The SPM has a unique address for these control messages. In the illustrative embodiment this address is determined by its backlane pin connection.

Each of the buffers 304, 305 and 306 is connected to a sanity and control interface circuit (SAKI) 307 which controls address recognition of the bus interface according to the pin connections, message buffering and various bus synchronization functions. SAKI 307 also provides a communication link between the CLC and a micro controller dedicated to the bus interface unit via the TDM busses. In addition it provides synchronization and periodic sanity check functions.

The buffers 304, 305 and 306 are also connected to a network process element (NPE) 308 operative in responsive to the micro controller 310 to interface the base band and speech processing circuit 204 to the TDM bus 150. NPE 308, under control of controller 310, accepts speech information and messages from the TDM busses 302 and 303 and applies the same to specific time slots in the TDM busses 302 and 303. NPE 308 provides conferencing logic to combine samples from the TDM into a smaller group of samples before applilcation to the baseband and signal processing cirucit 204. In addition it also provides gain adjustments to the PCM data in moving samples into and out of the baseband and signal processing circuit 204.

Figure 4:
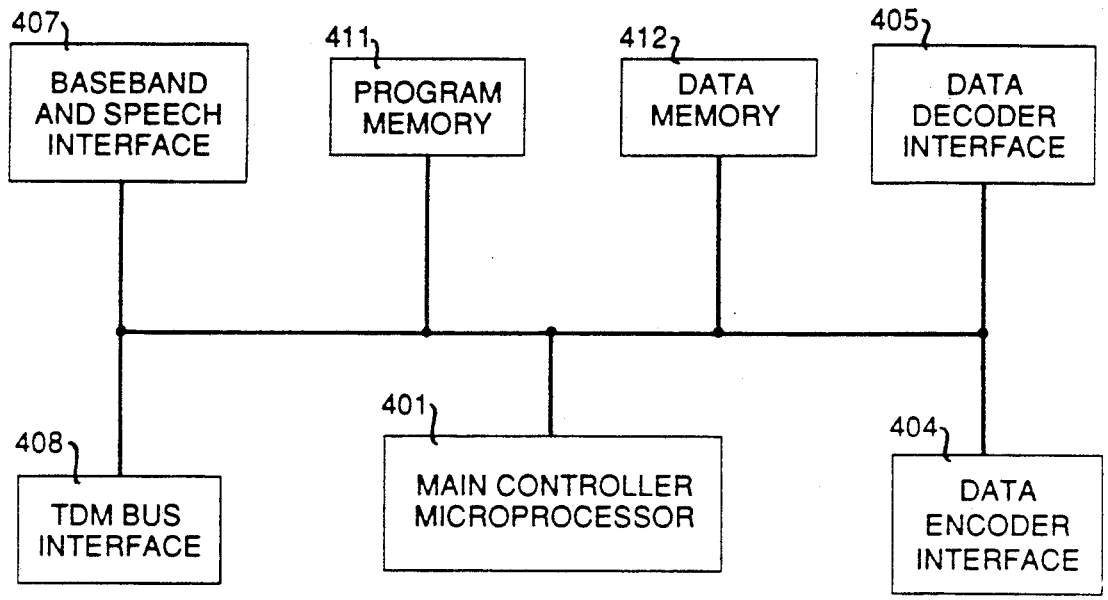
FIG. 4 is a block schematic of the main controller included in the module of FIG. 2.

A block schematic of the main controller circuit 205 is shown in FIG. 4. It provides the main overall control of all the functions of the SPM 202. It includes a microprocessor 401 and includes a bus 402 connecting the processor to a program memory 411, data memory 412 and a plurality of interface modules to connect it to the various functional units of the SPM 202. The data encoder interface 404 is a UART, operative to interconnect message data supplied by microprocessor 401 to the data encoder 207. The data decoder interface 405, comprising a plurality of data registers, couples the controller to the data decoder 206. An interface 407, comprising a pluralilty of data registers, couples the controller to the baseband and speech processing circuit 204 and an interface 409 couples it to the TDM bus interface 203.

Figure 5:
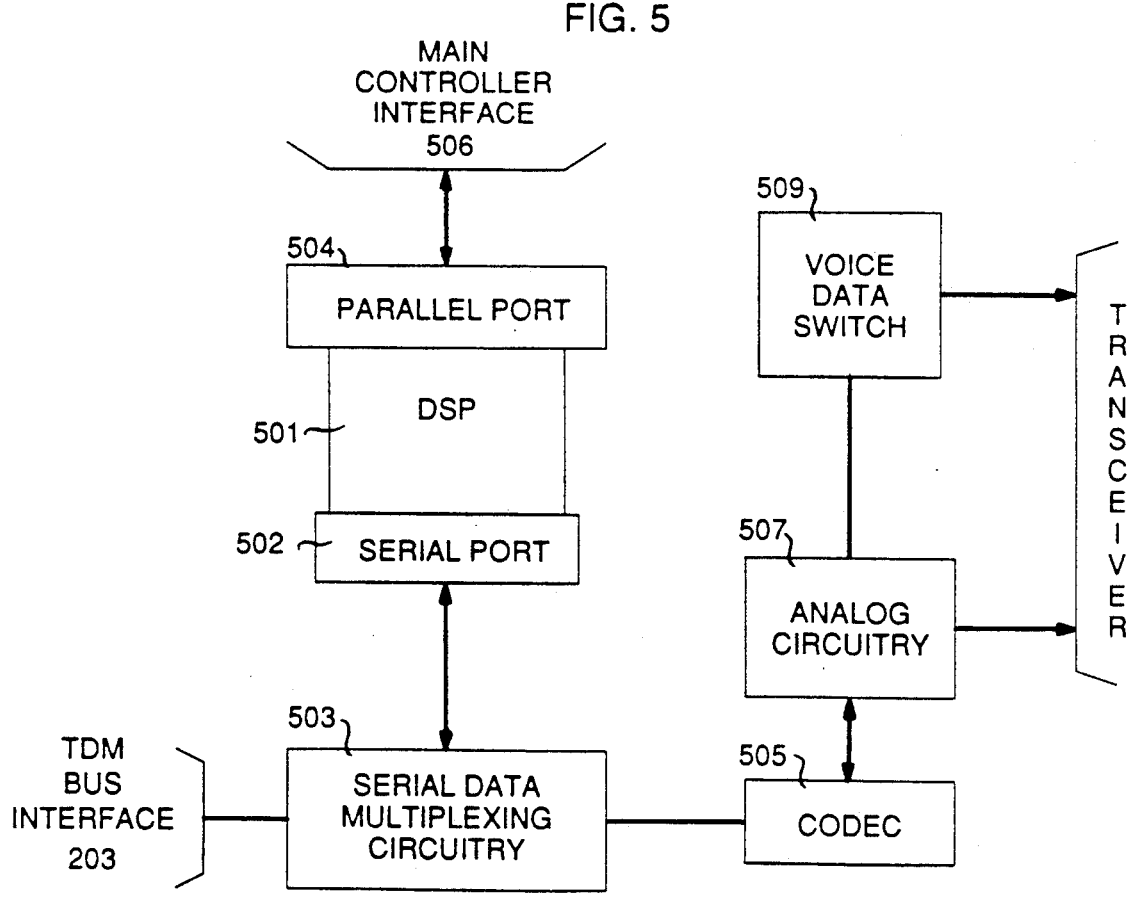
FIG. 5 is a block schematic of the baseband and speech processing unit included in the module of FIG. 2.

A schematic of the baseband and speech processing circuit is shown in FIG. 5. It includes a digital signal processor (DSP) 501, which is programmed to perform filtering, emphasis, limiting and companding functions on the data and speech signals in both the transmission and receive directions. It also detects and generates SAT tones when the RCU is operative to carry message signal traffic. A parallel port 504 connects the DSP 501 to a main controller interface 506 so that message signal may be transmitted to and received from the main controller. DSP 501 also includes a serial port 502 which is connected to a serial data multiplexing circuit 503. This circuit 503 allows the DSP 501 to connect to the TDM bus interface 203 and to a codec 505 which handles coding and decoding of the message signal. The analog circuitry 507 couples the codec 505 to a radio transceiver 201. Functions such as anti-aliasing low pass filtering and post conversion filtering are performed on the message signal by the analog circuitry 507. A voice data switch 509 controls the input source coupled to the radio transceiver through the analog switch 507.

The radio channel unit physical package is shown in a perspective view in FIG. 6. It includes the signal processing, communication and control module 601, a transceiver circuit module 602, a display assembly 603 and a connector block 604. The transceiver circuit module 602 includes two cover shields 605 and 606 to provide electromagnetic interference EMI shielding and to provide for heat exchange via the cooling fins 607. The transceiver module 602 is mechanically connected to the signal processing module 601 with screw connections. An electrical connection is included between the transceiver module 602 and the signal processing module 601 at approximately a midboard location (not visible in FIG. 6) as indicated schematically in FIG. 2.

A faceplate 608 is attached to the signal processing module and includes a latching mechanism 610 for securing the unit into a radio channel frame housing. The display assembly is arranged to output information through an aperture 614 in the faceplate 608.

Figure 7:
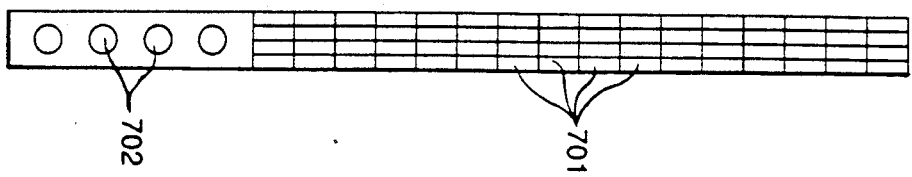
FIG. 7 is an elevation view of the connector of the package of FIG. 6 for connecting it to a backplane of a radio channel frame.

The radio channel unit is connected to the backplane of the radio channel frame through a connector block 604 which is electically connected to and mechanically attached to the signal processing module 601. An elevation view of the connector block 604 is shown in FIG. 7. It includes a plurality of pin connecting receptacles 701 in a grid array operative for connecting to the pins in the backplane of the radio channel frame and covering the upper two-thirds portion of the connecting block at the bottom of the connector block are coaxial rf connectors for coupling the radio frequency signal to appropriate rf connectors included in the backplane. This facilitates the ability of the circuit package to place all the critical specification cellular functions in the single radio channel unit package including the radio transceiver and the signal processing module.

We claim:
1. A cellular mobile telephone system, comprising:

a signal processing module for processing speech and control signals, a radio transceiver module for transmitting and receiving radio signals, the signal processing moldule and radio transceiver module combined mechanically and electrically into a single package, and the signal processing module being electrically connected between the radio transceiver module and a mobile telephone switching office, the single package including;

first and second circuit boards for supporting the signal processing module and the radio transceiver module and being connected together, a connector block mechanically mounted on at least one of the first and second circuit boards and operative for electrically coupling the radio transceiver module and the signal processing module to a supporting frame backplane of the cellular mobile telephone system and being electrically connected to the signal processing module and the radio transceiver module and having pin receptacle connections for data and control signals of the signal processing module and coaxial connectors for rf signals of the radio transceiver module.

2. A cellular mobile telephone system as claimed in claim 1, and further including:

display circuitry for displaying a status of the signal processing module.

3. A cellular mobile telephone system as claimed in claim 1, and further including:

a stored program control unit mounted within the signal processing module and operative for controlling message transmission and receive functions of the processing circuits included in the signal processing module.

4. A cellular mobile telephone system as claimed in claim 3 and further including:

the radio transceiver module having an EMI shield for enclosing at least the second circuit board and its mounted circuit components.

5. A cellular mobile telephone system as claimed in claim 1, and further including:

the signal processing module including;

a stored program controller mounted on the first circuit board, a bus interface circuit responsive to the stored program controller and operative through the connector to send and receive speech and control signals to and from a bus network coupled to a public switched telephone system, a baseband and signal processing circuit responsive to the stored program controller and connected to the bus interface circuit, and means responsive to the stored program controler to electrically couple the baseband and signal processing circuit to the radio transceiver module.

6. A signal processing and control module for a cellular radio telephone system as claimed in claim 5, and further including: a display module coupled to the bus interface circuit and operative for displaying a status of the signal processing module.

7. A signal processing and control module for a cellular radio telephone system as claimed in claim 6, and further including:

means for facilitating a mechanical attachment of the radio transceiver to the signal processing module.

* * * * *